(12) United States Patent
King et al.

(10) Patent No.: US 7,632,402 B2
(45) Date of Patent: Dec. 15, 2009

(54) CONTROL SYSTEM

(75) Inventors: Joseph A. King, Wayzata, MN (US); Jeffrey D. Johnson, Minneapolis, MN (US)

(73) Assignee: King Technology, Inc., Hopkins, MN (US)

( * ) Notice: Subject to any disclaimer, the term of this patent is extended or adjusted under 35 U.S.C. 154(b) by 0 days.

(21) Appl. No.: 12/079,543

(22) Filed: Mar. 27, 2008

(65) Prior Publication Data

US 2008/0290039 A1 Nov. 27, 2008

Related U.S. Application Data

(63) Continuation-in-part of application No. 12/069,237, filed on Feb. 9, 2008, and a continuation-in-part of application No. 11/805,527, filed on May 23, 2007.

(51) Int. Cl.
*E04H 4/12* (2006.01)
*E04H 4/14* (2006.01)
*C02F 1/76* (2006.01)

(52) U.S. Cl. ............ 210/167.11; 210/138; 210/143; 210/206

(58) Field of Classification Search ............. 210/138, 210/143, 167.1, 167.11, 198.1, 206, 139, 210/140
See application file for complete search history.

(56) References Cited

U.S. PATENT DOCUMENTS

| | | | | |
|---|---|---|---|---|
| 4,049,078 A | * | 9/1977 | Paitson et al. | 181/120 |
| 4,224,154 A | * | 9/1980 | Steininger | 210/85 |
| 4,550,011 A | * | 10/1985 | McCollum | 422/82.03 |
| 4,734,176 A | * | 3/1988 | Zemba et al. | 205/744 |
| 5,422,014 A | * | 6/1995 | Allen et al. | 210/743 |
| 5,494,112 A | * | 2/1996 | Arvidson et al. | 169/13 |
| 6,625,824 B1 | * | 9/2003 | Lutz et al. | 4/507 |
| 6,657,546 B2 | * | 12/2003 | Navarro et al. | 340/653 |
| 7,395,559 B2 | * | 7/2008 | Gibson et al. | 4/508 |
| 2001/0044153 A1 | * | 11/2001 | Gagnon et al. | 436/125 |
| 2005/0137118 A1 | * | 6/2005 | Silveri | 510/514 |

* cited by examiner

*Primary Examiner*—Fred Prince
(74) *Attorney, Agent, or Firm*—Jacobson & Johnson (57) ABSTRACT

An apparatus and method for controlling a water characteristic of a body of water by controlling the cyclic release of a water characteristic material into the body of water with or without the system being responsive to a level of the water characteristic in the body of water with the system capable of being controlled from a display or from a wireless control module or both.

12 Claims, 5 Drawing Sheets

CONTROL SYSTEM

CROSS REFERENCE TO RELATED APPLICATIONS

This application is a continuation in part of U.S. application Ser. No. 11/805,527 filed May 23, 2007, pending, Titled Control System and U.S. application Ser. No. 12/069,237 filed Feb. 9, 2008, pending.

FIELD OF THE INVENTION

This invention relates generally to control systems and, more specifically, a control system having control modules to adjust the water characteristics of a body of water with or without ongoing feedback of the water characteristics of the body of water.

STATEMENT REGARDING FEDERALLY SPONSORED RESEARCH OR DEVELOPMENT

None

REFERENCE TO A MICROFICHE APPENDIX

None

BACKGROUND OF THE INVENTION

Contained bodies of water where a person immerses himself or herself partly or wholly in the body of water can be found in swimming pools, spas, hot tubs, jetted tubs as well as other containers. Generally, the person immerses his or her body partially or wholly in the body of water in order to obtain the effects of the water. In order to make the body of water safe for human contact it is necessary to kill harmful microorganisms in the water, such as bacteria, which can be done by dispensing antibacterial materials into the water. These types of water characteristics can be referred to as water safety characteristics. In addition, from time to time other water characteristics of the body of water, such as water comfort characteristics are adjusted. For example, the water temperature may be changed or in some cases the pH of the water may be adjusted sometimes both for safety purposes and for the comfort of the water user.

In some types of systems at least one pump continually circulates the water in a container so as to provide a body of water with uniform water characteristics as well as to remove unwanted materials or debris from the water. During the circulation of the water dispensable materials, such as minerals or other ion yielding materials, can be controllable dispensed into the water through either inline dispensers or floating dispensers to control the microorganisms in the water. Other water characteristics such as water temperature can be controlled by a heating or cooling the water as it flows through a heat transfer unit. In either case the water characteristics whether safety or comfort characteristics can be changed to make the water suitable and safe for the user.

Water characteristics in the containers have been controlled by continually circulating water through the dispensable materials that are located in a dispenser. In these systems one controls the level of dispensable materials in the body of water by continually circulating the water through the dispenser with the size and number of openings in the dispenser limiting the amount of dispensable material released by limiting the rate of water flow flowing through the dispenser. One such system is shown in King Technology U.S. Pat. No. 7,052,615. Generally, the incremental control of the dispensing rates is determined by the number and the size of openings in the dispenser. Another type of disinfectant control is an activity-enhanced dispenser wherein an enhanced dispensing rate is obtained by the activity in the body of water. One such system is shown in King Technology, Inc. U.S. Pat. No. 7,147,770.

Still other dispensing systems such as on-demand systems dispense materials, such as chlorine, directly into the body of water when the level of dispensable material falls below an acceptable level. One such device is shown in U.S. Pat. No. 4,224,154. If the chlorine level in the pool drops below a minimum level a solenoid valve is actuated for a short period of time followed by a longer non-dispensing period of time to permit the dispensed material to disperse throughout the pool. Once the level of chlorine reaches the proper level the dispensing of chlorine to the swimming pool ceases.

The invention herein described can be used with or without a sensor and is well suited for general use as well as for small recreational water systems such as found in swimming pools, spas, hot tubs or the like either as original equipment or as an after market item. The invention described herein is suitable for use in conjunction with flow area adjustable dispensers to provide greater incremental dispensing control as well as more precisely control the release of dispensable materials to better maintain the proper level of dispensable materials in the body of water.

SUMMARY OF THE INVENTION

A control system comprising a time based controller operating on a cycle with a fixed period wherein the time-based controller regularly cycles a valve between a first condition and a second condition with the first condition dispensing a water characteristic affecting material and the second condition reducing or preventing the dispensing of the water characteristic affecting material. The invention also includes a method of controlling or setting a level of a safety or comfort characteristic of a body of water by circulating water to and from a body of water through a valve and a dispensable material and selecting a portion of the dispensing cycle period that a valve should be in a first open condition and a further portion of the dispensing cycle the valve should be in a second condition to direct less water or no water through the dispenser and repeating the opening and closing of the valve during a subsequent dispensing cycle to maintain the water safety or water comfort characteristics of the body of water at an effective level with or without the aid of a sensor to control the level of the dispensable material. The invention also includes the method of maintaining a water characteristic in a body of water, such as a spa, over a period of time by dispensing a water characteristic affecting material into the body of water and regularly interrupting the dispensing of the water characteristic affecting material into the body of water during the period of time to thereby maintain the water characteristic of the body of water by limiting when an amount of the water characteristic affecting material is dispensed into the body of water during the period of time. The control system further includes a boost function that can be manually or automatically engaged when the level of dispensable materials available for safety or comfort control falls below a desired level from an indicator of a non water characteristic of the body of water. A further feature of the invention is a control system that is responsive to input from control modules that include either a stand-alone display or to an input from an integrated container control system. Another feature of the invention is

DESCRIPTION OF THE PREFERRED EMBODIMENT

Figure 1:
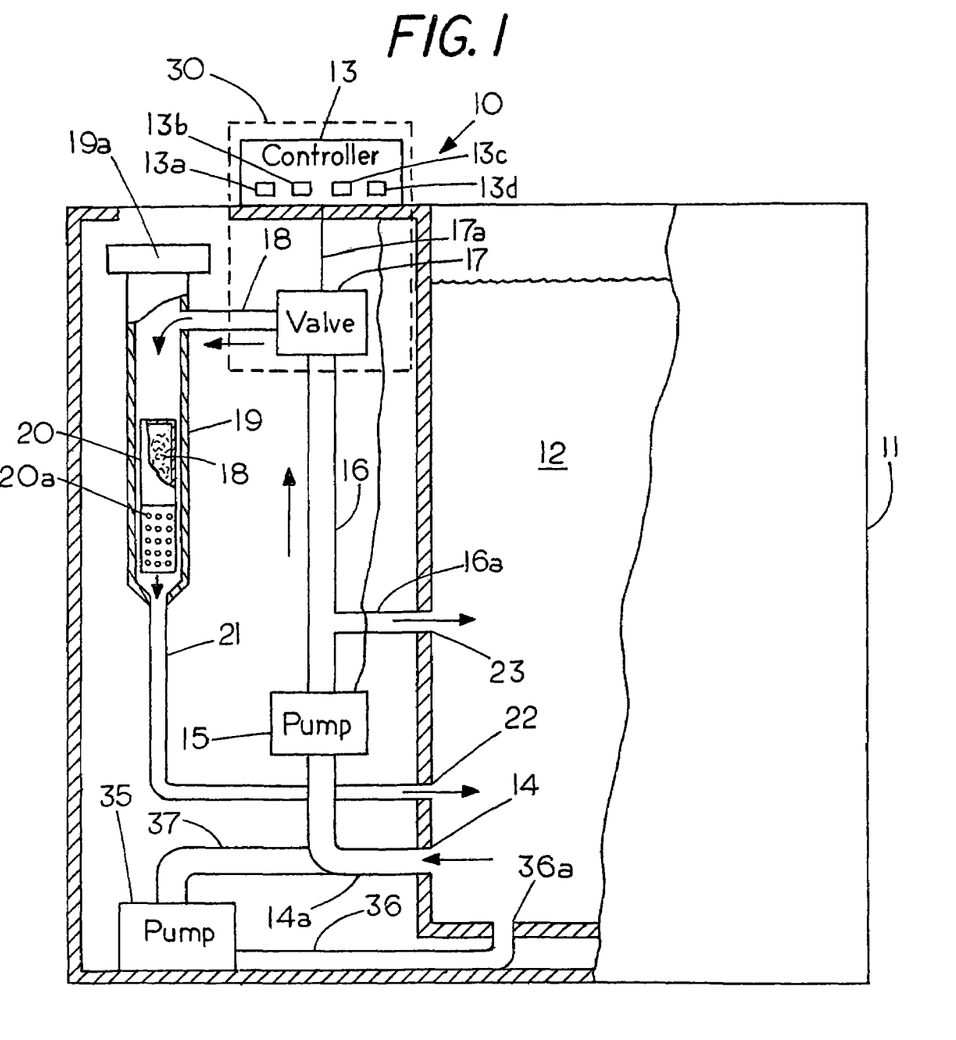
FIG. 1 is a partial cutaway view of a container having the control system of the present invention.

FIG. 1 shows a partial cutaway view of a system 10, such as a hot tub or spa, with a container 11 having a water circulation system including a circulation pump 15, an inlet 14, an inlet line 14a, an outlet line 16 that circulates fluid to and from the body of water 12 in container 11 through a valve 17, a dispenser 19 and a return line 21 that discharges the water with a water characteristic affecting material such as a dispensable material therein. A second pump 35 circulates water from the body of water 12 through an inlet water line 37 and discharges the water under pressure through a nozzle 36a. The control system 10 includes a time-based controller 13 and an electrically controlled valve 17 that can be open or closed by an electrical signal. The time-based controller 13 operates on a regular cycle with a fixed time period wherein the time-based controller 13 repeatedly cycles the valve 17 between a first condition and a second condition. In the first condition water flows through a dispensable material during a first portion of the cycle and the second condition either a water flow lesser than in the first condition or no water flows through the dispensable material during the remaining portion of the cycle.

In the event the valve 17 is in a closed condition the pump 14 directs the water back into the body of water 12 through an underwater side discharge outlet 16a to thereby provide continued circulation of the body of water. By dispensing the dispensable material such as a halogen or silver chloride (not shown) located in the dispenser, which is shown in FIG. 1 to be a dispenser cartridge 20, into the circulating water one can bring the dispensable material in the dispenser 19 into the body of water 12 without having a dispenser in the body of water 12. A filter, (not shown), removes any debris from the water during the circulation process. This type of circulation system, while useable with all types of bodies of waters are particularly well suited for use with recreational bodies of water that are found in swimming pools, spas, hot tubs or other types of jetted tubs which humans immerse themselves partially or wholly therein.

Figure 1A:
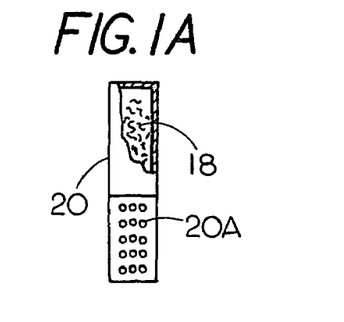
FIG. 1A is a partial cutaway view of the dispenser in the control system of FIG. 1.

FIG. 1A is a sectional view of dispenser 20 partially in section to reveal the dispensable material or water characteristic affecting material 18 located therein. Apertures 20 which can be opened or closed allow for limiting the flow of water into the dispenser 20.

The control system 30 is outlined in dashed lines in FIG. 1 and includes a controller 13 and a solenoid valve 17 that repeatedly receives a signal through line 17a to either open or close valve 17. When valve 17 is in a completely closed condition water is diverted away from dispenser 20 and flows through outlet 16a back into the body of water 12. When the valve 17 is in the open condition water flows through valve 17 and the dispensable material in dispenser cartridge 20 to dispense the dispensable materials into the body of water through the water line 21. Cycling the valve 17 between an open condition (for a first portion of a dispensing cycle) and a second condition (during a further portion of the dispensing cycle) where the valve 17 is completely closed is a preferred cycle. However, one can also cycle the valve 17 between an open condition and a second condition where the valve 17 is in partially closed condition thereby reducing the flow rate through the dispenser for the further portion of the cycle. It should be understood that the term valve herein is a device that one can use to control the flow of water into the dispenser 19. Controller 13 is a pulse width modulation system wherein the width of the output signal is varied to vary the duty cycle.

As pointed out in the background a number of existing systems control the level of dispensable materials in a body of water by continually circulating the water through a dispenser wherein the dispenser flow area limits the amount of dispensable material released. This is done by controlling the size or number of openings in the dispenser which in turn limits the amount of water flowing through the dispenser. Such systems are shown in King Technology U.S. Pat. Nos. 7,052,615 and 7,014,780.

Still other dispensing systems use sensors to control the dispensing of materials directly into the body of water when the level of dispensable material falls below an acceptable level. One such sensor driven dispensing system is shown in U.S. Pat. No. 4,224,154 wherein a sensor detects if the chlorine level is below a minimum level. If the chlorine is below a minimum level a solenoid valve is actuated for a short period of time followed by a longer non-dispensing period of time to permit the dispensed material to disperse throughout the pool before the chlorine level is checked again.

In contrast to the sensor driven on demand dispensing systems the invention herein can eliminate the need for a sensor to sense the level of dispensable material in the water yet the invention can still provide accurate control of the release of dispensed materials.

Figure 2:
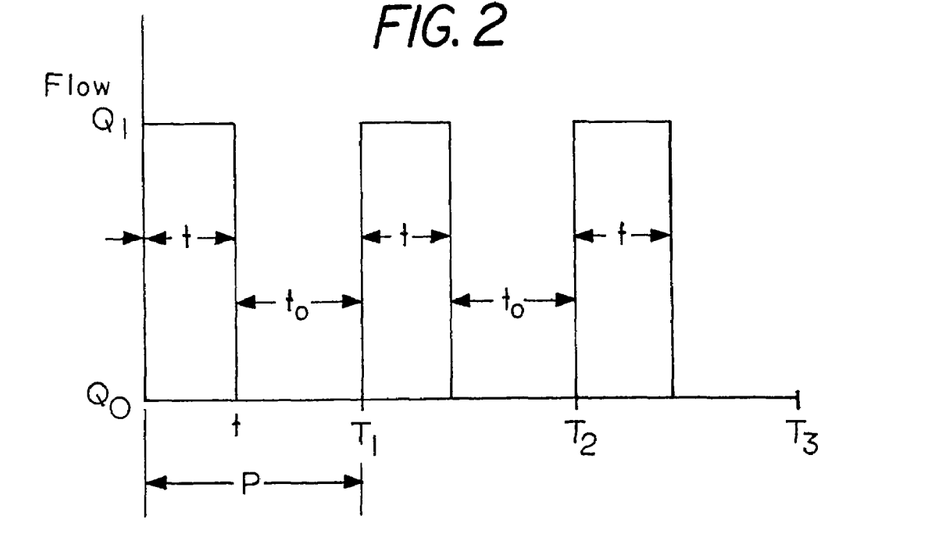
FIG. 2 is diagram of a cycle of the control system of FIG. 1.

FIG. 1 shows control system 10 includes a time based controller 13 and an electrically controlled solenoid valve 17 wherein the time-based controller repeatedly generates a signal that has a fixed period that cycles the valve 17 between a first condition and a second condition. During a first portion of a flow cycle the valve 17 directs water through a dispensable material and the remaining portion of the flow cycle the valve directs no water through the dispensable material. As an alternate to complete shut off of flow of water in the latter portion of the cycle one could direct some flow through the second portion of the cycle but less flow than through the first portion of the flow cycle. A reference to FIG. 2 illustrates a repeated on off cycle for dispensing materials wherein the system repeatedly goes from a flow condition to a non flow condition. That is, during a flow cycle the valve 17 goes from an open condition having flow rate $Q_1$ where water flows through the dispensable material to a closed condition having flow rate $Q_0$ where there is no water flow through the dispensable material. Once the period P is completed the flow cycle repeats itself. That is, at time $T_1$ the system completes one cycle and at time $T_2$ the system completes a second cycle and so on. By continually repeating the opening and closing of the valve 17 based solely on elapsed time one can maintain the safety or comfort characteristics of the body of water at an effective level without the aid of feedback from sensors. However, if desired sensors with feedback can also be used in conjunction with the present control system. Thus, instead of gradually increasing or decreasing a continuous flow rate through the dispenser 20 to obtain the proper amount of dispensable materials in the body of water the present invention permits one to control the time and the amount of water that can flow through the dispensable materials to obtain the proper amount of dispensable materials in the body of water.

The method of the invention includes controlling a level of a safety or a comfort characteristic of a body of water by circulating water to and from a body of water 12 through a valve 17 and a dispenser 19 by selecting a period P for a flow cycle or dispensing cycle, then selecting a portion of the dispensing cycle period that valve 17 should be in an open condition "t" and a remaining portion "$t_0$" of the dispensing cycle period where the valve 17 should be in a second condition of lesser flow or a no flow condition. FIG. 2 illustrates that, during a cycle the valve 17 goes from an open condition $Q_1$ where water flows through the dispensable material to a closed condition $Q_0$ where there is no water flow through the dispensable material in dispenser cartridge 20. Once the period P is completed the dispensing cycle repeats itself. That is, at time $T_1$ the system 10 completes one cycle and at time $T_2$ the system completes a second cycle and so on. By continually repeating the opening and closing of the valve 17 based solely on elapsed time one can maintain the safety or comfort characteristics of the body of water at an effective level without the use of a sensor to provide feedback. Although if one so desired a sensor providing feedback can be used with the present method. In addition the method can include the step of changing the portion of the dispensing cycle in the open condition and correspondingly changing the remaining portion of cycle in the closed condition to change the amount of dispensable material deliverable to the body of water without changing the period of the dispensing cycle. Also the step of changing the portion of the dispensing cycle in the open condition and correspondingly changing the remaining portion of cycle in the closed condition can be done on the go. The method can further include the step of changing a rate of dispensing materials from the dispenser by changing the flow area on a flow area controllable dispenser by changing a port size in the flow area controllable dispenser.

FIG. 1 shows the system can be used with circulation lines having a flow adjustable cartridge dispenser or cartridge 20 having flow adjustable ports 20a located in dispenser 19 or by having the dispensable material located in dispenser 19 without a cartridge 20 to hold the dispensable materials. When the system is used with a flow adjustable cartridge dispenser 20 the user can select a dispenser flow area by adjusting the open area of the ports 20a in the cartridge dispenser 20 based on the use of the body of water. For example, if two people use the spa three times a week it would require one port setting and if three people use the spa everyday it would require a different port setting. To set the cartridge dispenser to the proper flow area one generally removes cap 19a and the cartridge dispenser 20 from the dispenser 19 to adjust the flow openings. Generally, in these types of systems the water is continually circulated through the dispensable material and the flow area of ports 20a of the dispenser cartridge 20 can be changed to provide precise control.

The time-based system 10 with controller 13 can be used directly with the flow adjustable cartridge dispensers 20. In this type of control system wherein the time-based controller has a fixed period the time based controller 13 regularly cycles the valve 17 between a first condition and a second condition with the first portion of the cycle directing a first flow of water through a dispensable material and the remaining portion of the cycle directing a lesser flow of water or no water through the dispensable material. While FIG. 1 shows the circulation system located external to the body of water, if desired, the circulation system can be immersed directly in the body of water 12.

FIG. 2 illustrates a specific type of operation where the controller 13 is on for a time "$t_1$" and off for a time "$t_0$" during a time period P that typically lasts an hour or less. As can be seen in FIG. 2 the on off cycle repeats itself at regular intervals ($T_1$, $T_2$, $T_3$). The time "t" is on the horizontal axis and the amount of flow Q through the dispensable material is on the vertical axis. The cycle length is indicated by P and the fractional portion of the cycle length P wherein the flow is on is indicated by t and the remaining fractional portion of the cycle length P wherein no flow occurs is indicated by $t_0$. The on off cycle occurs during an elapsed time T and then the cycle repeats itself during a subsequent identical elapsed T. The time that the flow condition $Q_1$ occurs can be expressed as a percent of the total time for a cycle. For example, if the flow condition $Q_1$ is on for 10 minutes of a 50-minute cycle and off the remaining portion of the 50-minute cycle the on percentage would be 20% and the off percent would be 80%. The time period $T_1$ is followed by an identical time period $T_2$ which is then followed by identical time period $T_3$ and so on. Using the above example, during each time period the percentage where flow would be on is the same, namely, 20%. As a result the flow through the dispensable material in the dispenser 19 occurs at selected times during each period P. By adjusting the fractional amount of on time during a cycle one can intermittently deliver the dispensable materials to the body of water and can more accurately maintain the body of water with the proper amount of dispensable material. As a result dispensable material in dispenser 19 is periodically dispensed into the body of water 12 by the water periodically flowing through the dispenser 19 rather than being continually dispensed into the body of water by water continually flowing through the dispenser.

The length of the period P can be selected based on the type of application and in most instances a period P of less than an hour is preferred. This system 10 is also well suited for use with the flow adjustable cartridge or dispenser 20 shown in FIG. 1. When the controller 13 is used with a flow adjustable cartridge dispenser 20 one first selects the flow area of ports 20a in the dispenser cartridge 20. One then selects the period P and the times $t_1$ and $t_0$ to deliver the proper amount of dispensable material to the body of water. The use of a controller 13 with a flow adjustable cartridge 20 provides two benefits, the first is that one can obtain a wider range of flow conditions through the cartridge 20 and the second is that one can obtain more precise incremental control of the flow rate through the cartridge 20 since the port size through the cartridge 20 can be changed even though the time the valve 17 is in the open condition and the time the valve is in the closed condition remains the same. In addition, one can change the output of a dispensing cartridge 20 without having to remove the dispenser cartridge 20 to adjust the port size. That is, the amount of dispensable material dispensed into the body of water can be increased by increasing the percentage of on time $t_1$ while correspondingly decreasing the remaining off time $t_0$ or vice versa. Also one can change the amount of dispensable material delivered to the body of water over a given period of time by changing the time of the flow through the dispenser, that is by shortening or lengthening the period P.

While the invention is suitable for use with systems that have a pump running continually, such as found in spa systems where the pump directs water over a heater, the system can also be used with other systems having a range of pump run times.

Figure 3:
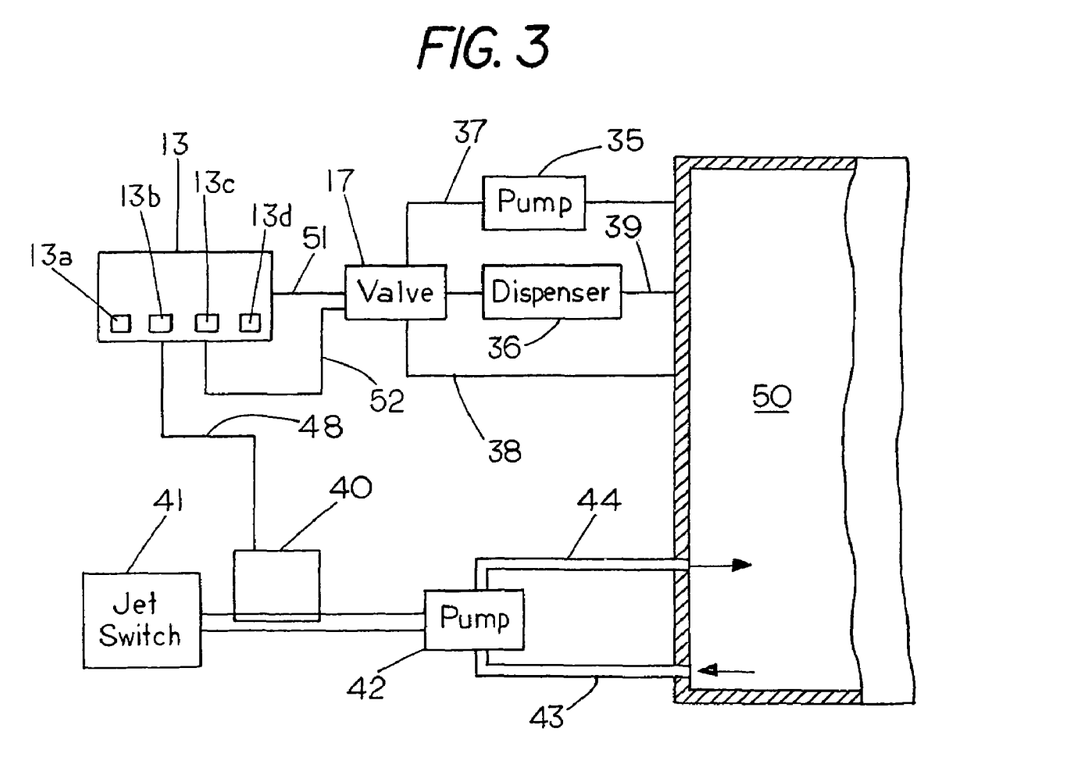
FIG. 3 is a schematic of a control system with an override.

Although the system functions effectively based solely on elapsed time, if desired, one can introduce an override or boost function into the system. FIG. 1 and FIG. 3 show the controller with controls 13a, 13b, 13c and 13d. Control 13a is a "boost" which can be used to override the valve close signal and keep the valve open for a longer time and therefore deliver more dispensable material to the body of water. That is, controller 10 can include a manual override 13a for overriding the controller cycle system that periodically changes the flow rate from flow rate $Q_1$ to flow rate $Q_0$. That is, the increase in delivery of more dispensable material can be obtained by maintaining the flow condition $Q_1$ while suppressing or preventing the second condition of no flow (flow rate $Q_0$) from occurring.

Another control 13b can be set to activate a different timed flow cycle based on a non-water characteristic of the water such as activity in the body of water. For example, the controller 13 can be set to monitor the operating time of the jet pump 35 that directs water into and around persons in a body of water such as a spa or the like. Since the length of time the jet pump operates is an indication of human activity in the tub and therefore an indication of increased bacteria levels in the tub one can use the jet pump operating time to automatically initiate a clean up cycle. That is, in response to a jet pump operating time exceeding a preset time the repeated cycling of the valve 17 can be overridden to allow water to continually flow through the dispensable material for an extended period of time to thereby bring the level of sanitizer or disinfectant up to the proper level. As a consequence the level of dispensable material released into the body of water is boosted for a period of time because the system has sensed the jet pump has been operating for an extended period of time. Once the boost cycle is completed the controller 13 reverts to the repeated cycling to maintain the level of dispensable materials at the proper level. Similarly, control 13c can be used to increase or decrease the length of the period P of the cycle and control 13d can be used to change the length of the on time t and the off time $t_0$ of the cycle. Thus the operator can, if desired, change the flow conditions and hence the amount of dispensable materials delivered to the body of water over a period of time by temporarily changing either the period P, the percentage of on time $t_1$ in a cycle or by simply overriding the cycle for a selected period of time. Thus, the system can include the step of monitoring a non-water characteristic such as monitoring an operational time of a jet pump and temporarily overriding the dispensing cycle to direct more flow through the dispensable material in response to the operational time of the jet pump.

Preferably, the cyclic controller 13 is set to have a cycle length of less than a day and generally less than an hour. For example, the cycle length can be set for forty minutes, which means the on off cycle will be repeated every forty minutes. Thus in a 24 hour day the cycle will occur 36 times. The duration of the on off cycle is fractionally selected. For example, during the cycle length P of forty minutes one can select solenoid valve 17 to be closed 35% (14 minutes) of the cycle length causing the valve to be open during 65% (26 minutes) of the cycle length. In the closed condition water is prevented from flowing through the dispenser 19 and in the open condition water is allowed to flow through the dispenser 19.

In contrast a system wherein the water is normally continually circulated through a dispenser the flow of water through the dispenser 19 therein is periodically interrupted by the cyclic opening and closing of the solenoid valve 17.

A further advantage of the present inventions is that it can be used with a dispenser cartridge that is flow adjustable to provide better control of the delivery rate of dispensing material. That is, the size and/or the number of open ports in the dispenser cartridge can be selected and fixed while the percentage of on time during a cycle is changed to thereby change the delivery rate of a dispensable material from the dispensing cartridge. By combining the selection of the size of the flow area through the dispenser cartridge with the amount of flow time through the dispenser cartridge one can more precisely control the dispensing of dispensable material into the body of water.

An example of such a dispenser where the flow area can be changed is shown in U.S. Pat. No. 7,059,540 and is herby incorporated by reference.

FIG. 3 shows a block diagram of a controller 13 connected to various components of the spa 50. In the embodiment shown the controller 13 sends a signal through line 51 to open and close the solenoid valve 17. A pump 35 directs water into the valve 17 and through the dispenser 36 and into line 39 into the spa when the system is in the "on portion" of the cycle. When the system is on the "closed portion" of the cycle the water is delivered through line 38 back into spa 12 without flowing through the dispenser 36.

Located separate from circulation system for the control valve 17 is a jet pump 42 that is operated by a jet switch 41. That is when a person in the spa wants to direct a jet of water at himself or herself the jet switch 41 is activated which starts pump 42 which draws water through line 43. Pump 42 then directs the water in the form of a water jet back into the spa 50 through line 44. In this embodiment an amp hour meter or other type of monitor 40 can be used to measure the pump run time i.e. the length of time the pump 42 is in operation. The monitor or sensor 40 thorough line 48 sends the information on run time for pump 42 to controller 13, which compares the run time to a preset run time. If the run time exceeds the preset run time the controller 13 sends a signal to valve 17 to override the regular cycle and keep the valve 17 open for a longer time. For example, water can be allowed to flow through the dispenser 36 for 3 hours without any on off cycling of water through the dispenser 36. This continuous flow of water through the dispenser would allow the body of water to catch up to the need for increased dispensable material.

Figure 4:
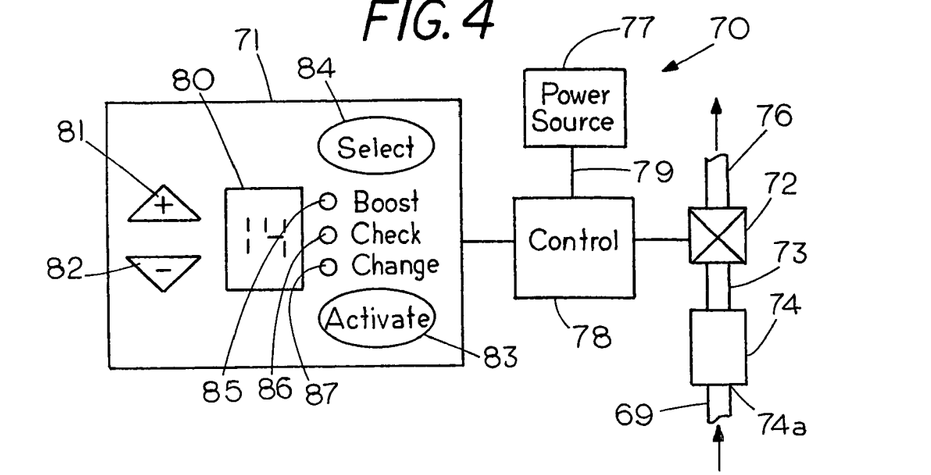
FIG. 4 is diagram of a control system with a stand-alone display and a valve that opens and closes a pipeline to a sanitizing dispenser.

FIG. 4 is diagram of a control system 70 with a control module comprising a stand-alone display 71 and a solenoid valve 72 that opens and closes a pipeline 73 from a dispenser 74 containing a dispensable material comprising a water characteristic affecting material such as a dispensable sanitizing material. Typically, dispensable sanitizing materials include such materials as chlorine, bromine, minerals, metals or the like that can sanitize a body of water by killing harmful organisms in the body of water. In operation, water, usually from a pump, is normally supplied to an inlet 74a of dispenser, 74. When valve 72 is in an open condition the water flows through the dispenser 74 thereby dispensing the dispensable material therein into the pipeline 76 that carries the water and the dispensable material to the body of water to adjust or affect the water characteristics of the body of water. In the embodiments shown a separate power source 77 supplies power to cyclic control 78 through electrical lead 79. Control 78 comprises a conventional pulse width modulation circuit therein wherein the width of the duty cycle of the output signal is varied to control the on or open time of valve 72.

The system 70 is capable of cyclical control of a water characteristic or water characteristics of a body of water, for example, a water characteristic such as the pH or the sanitizer level can be maintained or controlled with or without feedback of the water characteristic from the body of water. That is, on going measurement of the water characteristics of the body of water and then automatically updating the dispensing rate of a water characteristic material through continuous or intermittent feedback are unnecessary to maintain or control a water characteristic or water characteristics of body of water. The cyclic control 78 can be responsive, i.e. set by either a stand-alone display 71 or a spa display. The cyclic control 78 repeatedly generates a cyclic output signal having a first signal and a second signal with the first signal different than the second signal. FIG. 2 illustrates a typical signal wherein the pulse width is modulated to interrupt the dispensing of a water characteristic affecting material.

In the embodiment of FIG. 4 the stand alone display 71 includes a visual numerical display 80, a boost control 85, a check control 86 function such as check sanitizer, a change control feature which reminds a user to change minerals or sanitizers with a select button 84 for selecting of any of the above features. Once a feature is selected one activates the control feature by pushing activate button 83. In the embodiment shown the numerical display 80 displays the percentage of time the water flows through the system for every cycle. For example, the displayed numerical 14 indicates a 14% duty cycle. That is, the system is on 14% of the period P which means that with system 70 water flows through dispenser 74 14% of the time of each cycle, The display 71 further includes a plus switch that allows one to increase the percentage of time water flows through the dispenser 74 for every cycle and a minus switch where one can decrease the percentage of time that water flows through the dispenser 74 for every cycle. For example, if one wanted to increase the percentage of time to a 25% duty cycle one would push button 81 until the display shows 25. The control 78 would then have a 25% on time for each cycle. Thus, through a process of manual setting the percentage of on time (duty cycle) of control 78 one can increase or decrease the amount of dispensable material released into the body of water.

In operation system 70 includes an electrically operated valve 72, such as a solenoid valve, that is responsive to the first signal, which can open the valve, and the second signal, which can close the valve, to thereby dispense a water characteristic affecting material into a body of water in response to the relation of the on time of the first signal and the off time of the second signal to thereby either maintain or change the water characteristic of the body of water.

Thus system 70 comprise a water characteristic control system that can be operated independent of operator controls on a body of water with the control of the dispensing in the body of water determinable by controlling the percentage of on time in a duty cycle of a pulse width modulated signal.

System 70 as shown in FIG. 4 is useable as an after market system that can be quickly added to an existing system by merely splicing the line 76 with dispenser 74 into a circulating fluid line in a body of water.

Thus the system 70 includes the method of maintaining a water characteristic in a body of water, such as a spa, over a period of time by dispensing a water characteristic affecting material 18 into the body of water 12; and regularly interrupting the dispensing of the water characteristic affecting material 18 into the body of water during the period of time to thereby maintain the water characteristic of the body of water by limiting when an amount of the water characteristic affecting material is dispensed into the body of water during the period of time. Additionally, if desired one can suspending the step of regularly interrupting the dispensing of the water characteristic affecting material to accommodate extra use of the spa.

Figure 5:
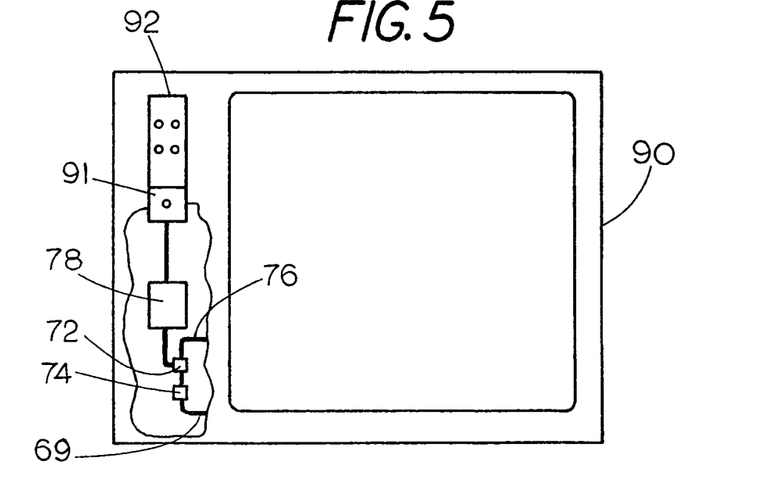
FIG. 5 is a top view of a spa partially in section revealing the control system with a display integrated with the display of the sap.

FIG. 5 is a top view of a spa 90 partially in section revealing the water characteristic control 78 with a control module comprising display 91 integrated with the display and control panel 92 of the spa 90. In this embodiment the manual controls 81, 82, 83, 84 85, 86, 87, as shown in FIG. 4, have been integrated into the control panel 92 thereby providing a single location for the spa controls as well as the water characteristic controls. While all the controls of system 71 can be integrated if desired more or less controls could be integrated into display 71. While the system is shown with spa controls it is envisioned that other types of fluid systems requiring control of the fluid characteristic of the system can also be used with the system of FIG. 4.

Figure 6:
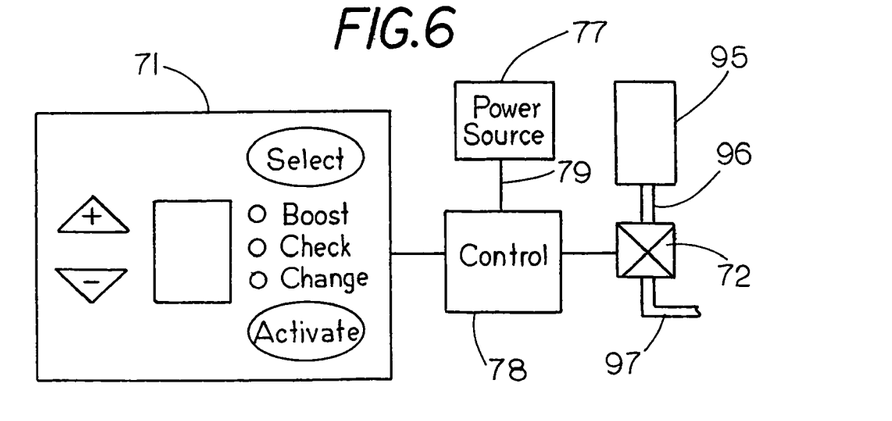
FIG. 6 is a diagram of a control system with a stand-alone display and a valve that opens a container carrying a water characteristic material.

FIG. 6 is a diagram of a control system with a the control module 71 comprising a stand-alone display and a valve 72 that opens and closes a pipeline 96 from a source of a water characteristic affecting material that can be added to the body of water to change the water characteristic of the body of water. The dispenser 95 can carry a water-characteristic affecting material such as a pH adjusting material that is periodically released through pipeline 96 when the valve 72 is in an open condition. In this embodiment the water characteristic affecting material is released directly into the fluid line without having water flow through a water characteristic affecting material in the dispenser 95. Thus a further feature of the invention is a control system that is responsive to either a stand alone display or to a control display such as a spa display control where the control of the dispensing of the water characteristic affecting material is integrated with the control display for a body of contained water.

Thus FIG. 4 shows a system 70 for cyclical control of a water characteristic in a body of water with or without feedback comprising a cyclic controller 78 responsive to controls on either a stand alone display 71 or controls on a spa display 92, a cyclic control 78 repeatedly generating a cyclic output signal having a first signal and a second signal with the first signal different than the second signal and a valve 72 responsive to the first signal and the second signal to periodically open to dispense a water characteristic affecting material into a body of water in response to the on time of the cycle to thereby either maintain or change the water characteristic of the body of water.

Thus, the systems of the present invention provides low cost easy to use systems that are consumer friendly and can be used in an in home spa or swimming pool or the like and in one embodiment includes a system for cyclical time control of a water characteristic affecting material comprising a dispensable material deliverable to a body of water; a valve 17, 72 having a first valve open condition and a second condition; and a controller 13 repeatedly generating a control signal with a fixed time period P with a portion "t" of the fixed time period P comprising a valve open signal to allow water to flow through the dispensable material and a remaining portion "$t_o$" of the fixed time period P comprising a valve close signal to decrease flow through the dispensable material during the remaining portion of the fixed time period.

In another embodiment the invention comprises a system 10 for cyclical control of a water characteristic without feedback comprising: a body of water 12; a circulation line 16, 21 to and from the body of water; a dispenser 19 located in the circulation line; a dispensable material located in the dispenser 19; a pump 15 for directing water into the circulation line; a valve 17 having an open condition to allow water to flow through the circulation line and a closed condition to prevent water from flowing through the circulation line; and a controller 13 that repeatedly generates a signal having a fixed time period P with a portion "t" of the fixed time period comprising a valve open signal to open the valve 17 to allow water to flow through the dispenser and a remaining portion "$t_0$" of the fixed time period P comprising a valve close signal to close the valve 17 to prevent water from flowing through the dispenser 20 to thereby periodically limit the dispensing of the dispensable material into the body of water. A further aspect of the invention is the method of maintaining a water characteristic in a body of water over a period of time by dispensing a water characteristic affecting material into the body of water and regularly interrupting the dispensing of the water characteristic affecting material into the body of water during the period of time to thereby maintain the water characteristic of the body of water by limiting when an amount of the water characteristic affecting material is dispensed into the body of water during the period of time.

It is apparent that with the invention described herein one can provide a cyclical method of day-to-day controlling a characteristic of a body of water. In addition, when the controls are integrated into the spa control pad as described herein the consumer needs only one control pad to control the spa functions as well as the water characteristics of the water in the spa. While examples of water characteristic affecting material have been described herein it is understood that the invention can be used with other materials that are dispensable.

While the invention herein has been described in cyclical control of recreational bodies of water the system is also suitable for use in other systems, for example jetted bathtubs, foot baths for pedicures and for sanitation of water in recreational vehicles including yachts, boats and the like.

Figure 7:
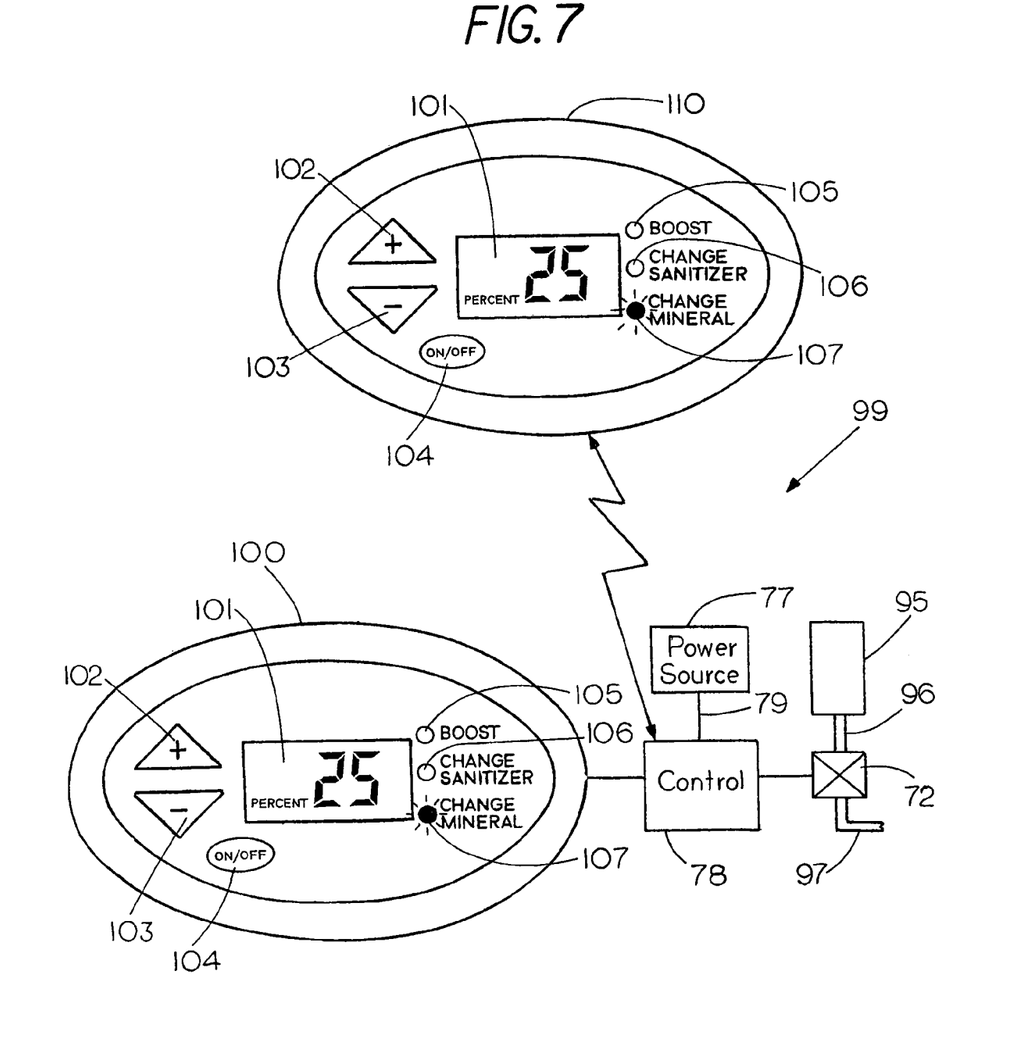
FIG. 7 is shows a dual mode spa control system with a first control module hard wired into the control system and a second remote control module in wireless or RF communication with the control system.

FIG. 7 illustrates a dual mode spa control system 99 with a stand-alone control module 100 and a RF or wireless remote control module 110. The control system 99 includes a control unit 78 that can receive signals from either of the control modules 100 or 110 and can generate a signal to open and close a valve 72 in response to a signal from either control module 100 or remote control module 110. Remote control module 110 is wireless while control module 100 can either be either hard-wired or wireless. A control signal from either module can open and close a pipeline 96 from a source of a water characteristic affecting material in dispenser 95 thus allowing more or less water characteristics affecting material to be added to the body of water in the spa to change the water characteristic of the body of water in the spa. For example, the dispenser 95 can carry a water-characteristic affecting material such as a sanitizer or minerals that are periodically released through pipeline 96 when the valve 72 is in an open condition. In the example shown in FIG. 7 the water characteristic affecting material in dispenser 95 is released directly into the fluid line 97 without having water flow through the water characteristic affecting material in dispenser 95. Other methods of releasing water characteristic affecting materials into the spa may be used, for example, directing water through the water characteristics affecting material in the dispenser. Control module 100 and control module 110 are shown with identical or substantially identical display faces so that either control module can be controlled and operated in the same manner. While control modules are shown with the same or identical display faces in some instance one may want to have control modules with different display faces.

In the system of FIG. 7 the first control module 100, which is mounted on or at the spa and preferable as part of the spa display, includes a viewing screen 101, a + button 102 for increasing a signal and a − button 103 for decreasing a signal with the buttons positioned left of viewing screen 101. A set of visual indicators, such as led lights, 105, 106 and 107 are positioned to the right of viewing screen 101 with each of the led lights representing different modes. For example, led light 105 represents a "boost" mode led light 106 represents "change sanitizer" mode, and led light 107 represents "change mineral" mode. In the mode shown, a "change mineral" signal could be used to change the on time of the dispensing cycle. The "boost" mode may be used to change the water characteristics by temporarily overriding the dispensing cycle. Likewise in the "change sanitizer" mode information is provided to the user on the time left before the sanitizer minerals need replenishing. While 3 separate items of information are viewable on screen 101 more or less items of information could be viewed or controlled with either or both of the control modules. Also other features that do not necessarily relate to the spa may be desired to included in either or both control module 100 and 110.

In operating of the control module 100, which is mounted as part of the display system on the spa, the amount of percentage of on time of the duty cycle can be increased or decrease by use of the + 102 button and the − buttons 103. FIG. 7 shows the on time of the duty cycle illustrated in FIG. 2 is 25%. For example, in the increase mineral mode (led 107 illuminated) shown in FIG. 7, to increase the percentage of on time of the duty cycle one would push on + button 102 and to decrease the percentage of on time on the duty cycle one would push on the − button 103. Thus with control module 100 one can increase or decrease the on time of the duty cycle.

FIG. 7 shows a second control module 110 which has a viewing face that is identical or substantially identical to the viewing face of control module 100. Control module 100 communicates directly with control 78 and control module 110 is wireless and communicates with control 78 through radio frequencies. That is control module 110 comprises a transceiver that can both transmit and receive information from the control unit 78. A feature of the dual control module system shown in FIG. 7 is that the various spa features can either be controlled either at the spa or can be remotely controlled through the hand held control module 110.

The control modules are preferable linked to each other so that a change of the display 101 on one of the modules is also reflected in a change of the display 101 on the other module. However, if desired one may want to delink the control modules or inactive one or the other. For example, one may want to deactivate the spa control module 100 to if the persons in the spa are not familiar with the controls and could accidentally change settings to an improper setting.

Figure 8:
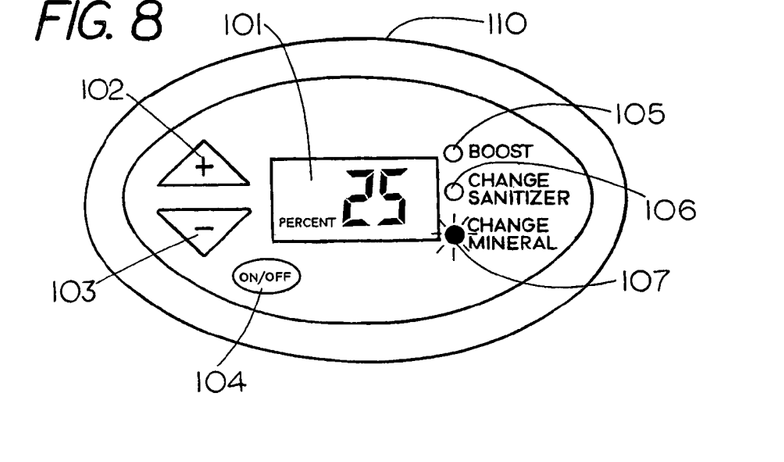
FIG. 8 shows a control module in a first mode.
Figure 9:
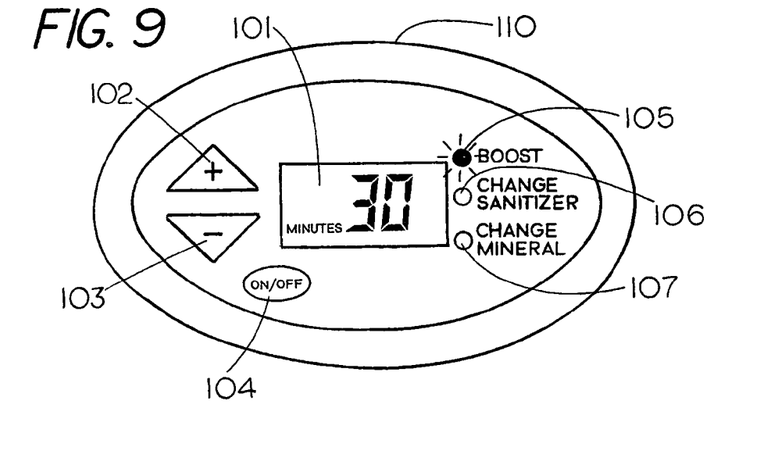
FIG. 9 shows the control module of FIG. 8 in a second mode.
Figure 10:
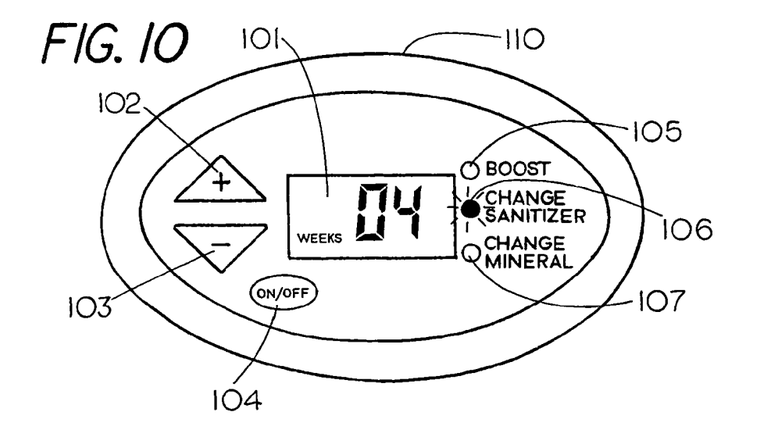
FIG. 10 shows the control module of FIG. 8 in a third mode.

To illustrate how three different items of information can be monitored and controlled by the system 99 reference should be made to FIG. 8, FIG. 9 and FIG. 10 which show the control module 101 in three different modes. FIG. 8 shows the control module in the mode for changing the amount of minerals that are dispensed, that is the "change mineral" light 107 is on the on position. The setting shown is 25 percent as indicated on viewing screen 104. The percent, which is percentage of on time during the duty cycle, can be increased or decreased by using the + button 102 to increase the percentage of on time and the − button 103 to decrease the percentage of on time. Once the percentage is selected one may toggle to another mode and another screen by pushing on the button 104.

FIG. 9 shows the identical control module 110 when the mode and screen is changed to the "boost" mode as indicated by the illumination of led 105. To arrive at the screen that shows the boost one can merely push on the button 104 until the boost light is on. The viewing screen 101 then shows that a boost will occur for 30 minutes. If desired the boost time could be increased or decreased by using the + button 102 and the − button 103. Once the length of the boost mode is selected one can toggle to another mode and another screen by pushing on button 104.

FIG. 10 shows the control module 110 in the information mode or "change sanitizer" mode where the length of time before changing the sanitizer is shown on screen 101. In the example shown screen 101 indicates that the sanitizer needs to be changed in 4 weeks.

As viewed in FIG. 7 the on/off time of the system 99 can be controlled by a control module 100 at or incorporated as part of the spa display or the system can be controlled or monitored remote from the spa through a remote control module 110. In the example shown the viewing face of the controls on the control module on the spa display and the viewing face of the control module 110 which is remote from the spa are identical to avoid confusion; however, if desired the display faces may include differences.

Thus a further feature of the invention is a control system that is responsive to either a single control module, or two or more control modules with the system controllable from either the spa or proximate to the spa or both. While the system is shown in conjunction with a spa system it is envisioned that others may use the control system in other systems that control recreation or drinking water.

We claim:

1. A system for cyclical control of a water characteristic in a body of water without a sensor comprising:
    a time-based cyclic controller responsive to a display, said cyclic controller having a fixed time period during which the cyclic controller repeatedly generates a duty cycle as a portion of a cyclic output signal having a first signal and a second signal with the first signal different than the second signal;
    a display switch for an operator to manually set the duty cycle wherein said duty cycle is maintained until manually reset by the operator, said display switch comprising a manual operator control wherein the cyclic controller is integrated to a spa control system with the cyclic controller responsive to the manual operator control in a spa display pad; and
    a valve responsive to the first signal and the second signal to periodically deliver a water characteristic affecting material into a body of water in response to the duty cycle to thereby either maintain or change the water characteristic of the body of water.

2. The system of claim 1 including an outlet and a dispenser for holding the water characteristic affecting material with the first signal opening the valve to allow water to flow through the water characteristic material and the second signal closing the valve to direct water into the body of water while preventing water from flowing through the water characteristic affecting material.

3. The system of claim 1 including a flow adjustable cartridge containing the water characteristic affecting material wherein the water characteristic affecting material comprises a pH adjuster and the display includes a viewing screen providing information on either a boost condition, a sanitizer condition or a mineral condition.

4. The system of claim 1 including a dispenser for holding the water characteristic affecting material with the first signal opening the dispenser to release the water characteristic affecting material into the body of water and the second signal closing the dispenser to prevent release of the water characteristic affecting material into the body of water wherein the display includes a viewing screen for showing a length of the duty cycle.

5. The system of claim 1 wherein the system includes at least two control modules with one of the least two control modules mounted as part of a spa display and another of the at least two control modules in wireless communication with the system.

6. The system of claim 5 wherein the valve is a solenoid valve that opens in response to the first signal and closes in response to the second signal and each of the control modules include a viewing screen.

7. The system of claim 1 wherein the display includes an override for overriding the cyclic output signal to thereby dispense the water characteristic affecting material independent of the duty cycle of the system.

8. The system of claim 7 including a jet pump wherein the controller monitors the operating time of the jet pump to initiate a boost cycle when an operating time of the jet pump has exceeded a preset time.

9. The system of claim 1 including a flow adjustable dispenser having flow adjustable ports with the flow adjustable dispenser holding the water characteristic affecting material and the water characteristic affecting material comprises a halogen and the control of the release of the water characteristic affecting material is based solely on the cycling of the valve from an open condition to a closed condition.

10. The system of claim 1 including a control module incorporated as part of the display with a face of the display having a viewing screen proximate the display switch with the display switch operable to change a mode of the viewing screen, a power source for the cyclic controller and the body of water is in a spa.

11. The system of claim 1 wherein the system comprises a spa control system that includes at least two control modules with one of the least two control modules mounted as part of a spa display and another of the at least two control modules in wireless communication with the control system.

12. The spa control system of claim 11 wherein each of the at least two control modules each include a visual display and each of the control modules displays the same information.

\* \* \* \* \*